United States Patent [19]

Sakamoto

[11] 3,727,334
[45] Apr. 17, 1973

[54] FILING FRAME OF FILM MOUNTS

[76] Inventor: Yoshichika Sakamoto, No. 15, 2-chome, Senkawa-cho, Toshima-ku, Tokyo, Japan

[22] Filed: Nov. 13, 1970

[21] Appl. No.: 89,162

[30] Foreign Application Priority Data

Nov. 17, 1969 Japan ..............................44/108285
Dec. 26, 1969 Japan ..............................44/123204

[52] U.S. Cl. ........................40/104.18, 40/158 R
[51] Int. Cl. ..............................................G09z 23/10
[58] Field of Search ....................40/106.1, 158 R, 40/159, 104.18, 104.19

[56] References Cited

UNITED STATES PATENTS

| 3,277,598 | 10/1966 | Lightburn | 40/158 R |
| 2,968,882 | 1/1961 | Ozeki | 40/106.1 |
| 3,466,126 | 9/1969 | Sakamoto | 40/158 R |

FOREIGN PATENTS OR APPLICATIONS

| 1,218,994 | 6/1966 | Germany | 40/104.19 |

*Primary Examiner*—Lawrence Charles
*Assistant Examiner*—J. H. Wolfe
*Attorney*—Young & Thompson

[57] ABSTRACT

A filing frame for holding a plurality of film mounts in a lattice disposition while allowing inspection and projection of the films as held by the frame. Each film storing space of the filing frame has a pair of notches formed at lower ends of its seating ledges, so as to allow the film mount to swing about the border edge between the notch and a non-notched portion of the seating ledge.

3 Claims, 11 Drawing Figures

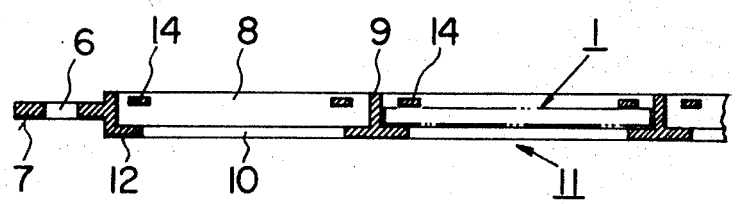
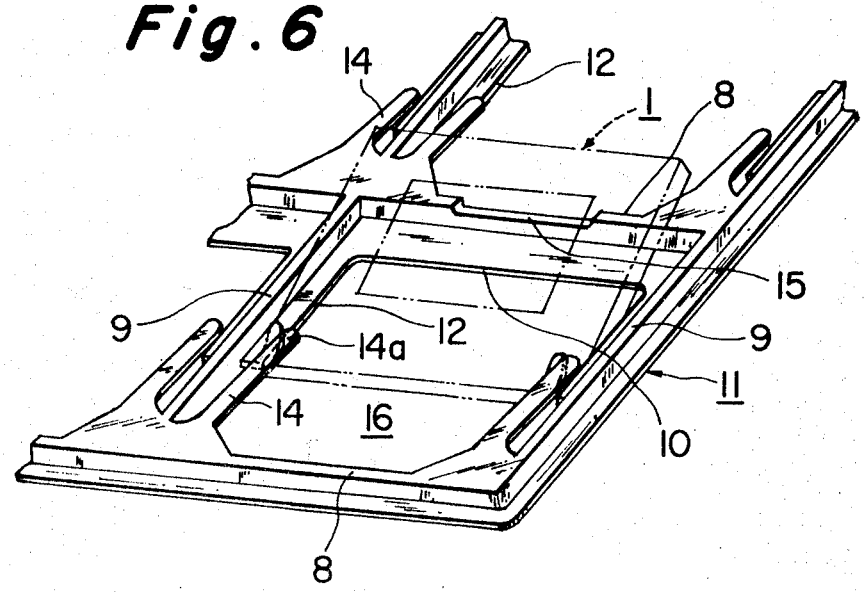

INVENTOR
YOSHICHIKA SAKAMOTO
BY Young + Thompson
ATTORNEYS

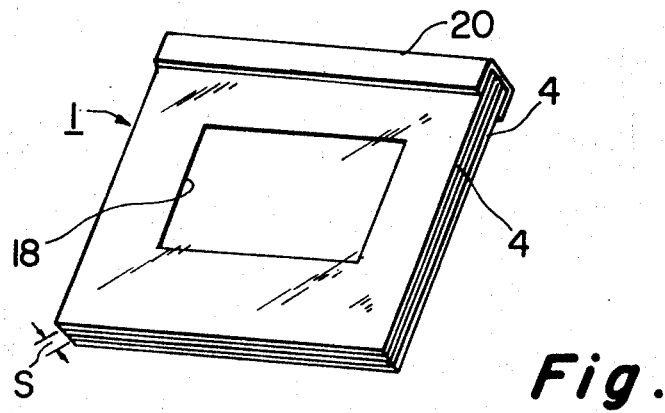
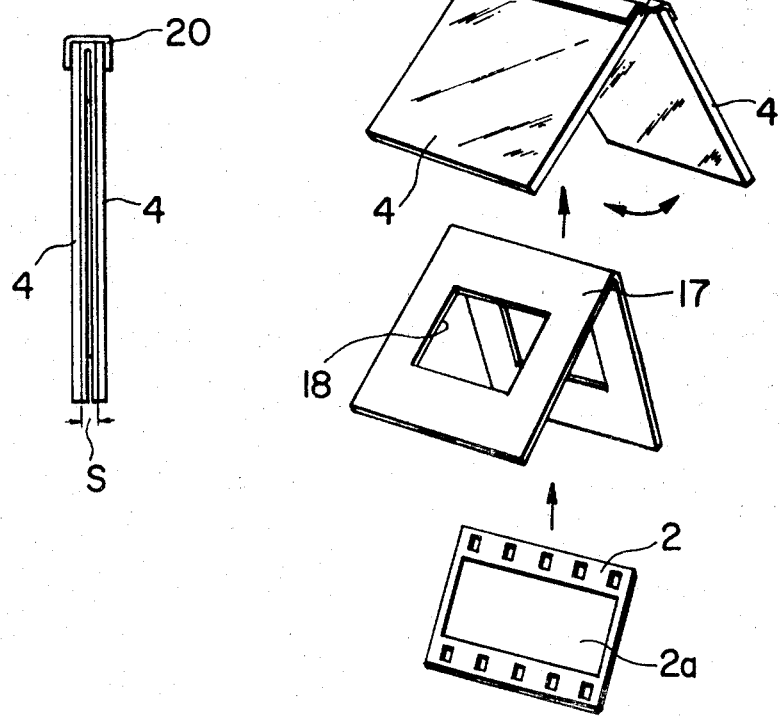

FILING FRAME OF FILM MOUNTS

This invention relates to a filing frame of film mounts, and more particularly to a filing frame suitable for orderly filing a large number of film mounts, such as paper mounts and glass mounts.

It is rather troublesome to handle a large number of film mounts one by one for storing, or for lecturing or the like. In order to facilitate the holding of a large number of film mounts, such as color slides carried by paper or glass mounts, in an orderly manner, there have been used filing frames or filing plates. For instance, the present applicant has disclosed a file plate for filing slide-holding frames in his U.S. Pat. No. 3,466,126.

Known filing plates or filing frames for holding film mounts, however, have a shortcoming in that their structure was rather complicated and they use a comparatively large number of parts, so that the known filing frames and plates for such purposes have been expensive. Especially, for holding or filing a large number of heavy film mounts, such as glass mounts, it has been necessary to use separate holding members in conjunction with the filing plates or to incorporate sturdy holding fingers or lugs integral with the filing plates or frames. Thus, filing plates of heavy film mounts are especially costly.

Therefore, an object of the present invention is to obviate the aforesaid difficulties of the known filing plates or frames for holding film mounts, by providing an improved filing frame for film mounts. The filing frame according to the present invention is very simple in structure, yet securely holds a large number of film mounts, paper or glass, in an orderly fashion. One of the important features of the filing frame of film mounts according to the present invention is in its light weight which means savings of material and reduction of manufacturing cost. According to another feature of the present invention, seating ledges of each of filing spaces formed in the filing frame for receiving individual film mounts are partially cut off to form notches, which notches face holding lugs of each filing space in such a manner that each film mount can be mounted on and dismounted from the filing frame very easily and quickly as compared with conventional filing plates.

For a better understanding of the present invention, reference is made to the accompanying drawings, in which:

FIG. 5 is a sectional view taken along the line V—V of FIG. 3;

FIG. 6 is an enlarged partial perspective view of the filing frame;

FIG. 9 is a schematic perspective view of a glass mount which can conveniently be held by the filing frame of the invention;

FIG. 10 is a side view of the glass mount of FIG. 9; and

FIG. 11 is an exploded view of the glass mount of FIG. 9.

Like parts are designated by like numerals and symbols throughout the drawings.

Figure 1:
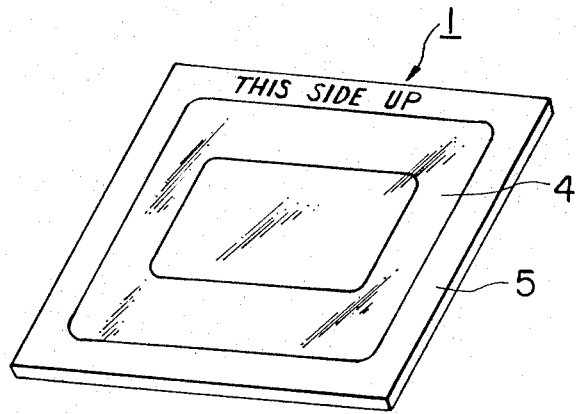
FIG. 1 is a perspective view of a film mount to be held by a filing frame according to the present invention.
Figure 2:
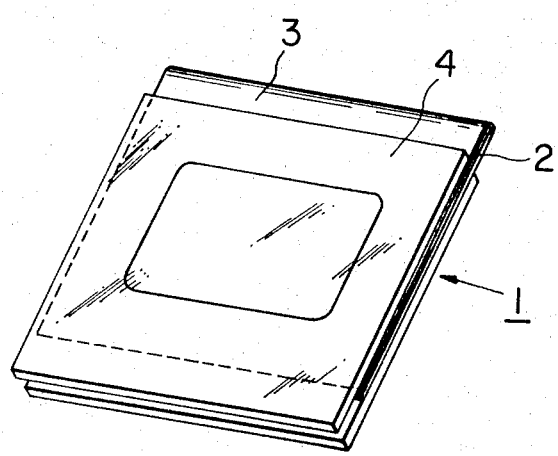
FIG. 2 is a perspective view of another film mount.

Referring to FIGS. 1 and 2, a glass mount 1 to be held by the filing frame of the present invention consists of a film 2, such a color slide film a pair of light-interrupting paper sheets 3 for interrupting light beams from a light source except through the film 2, and a pair of glass plates 4 sandwiching the light-interrupting paper sheets with a film held therebetween. A binding frame 5 acts to hold the two glass plates 4 as attached to the light-interrupting paper sheets 3.

Figure 3:
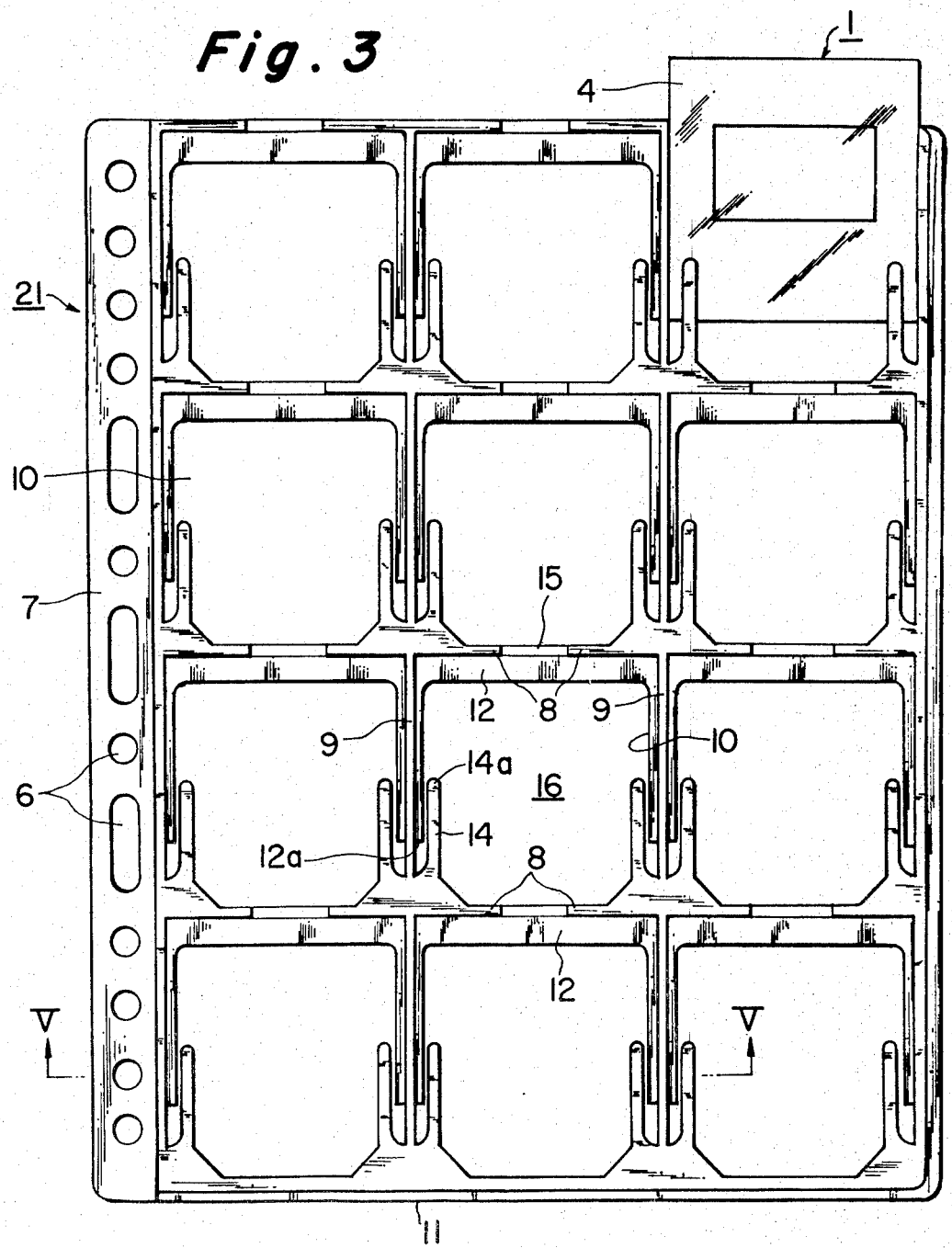
FIG. 3 is a front view of a filing frame of film mounts according to the present invention.
Figure 4:
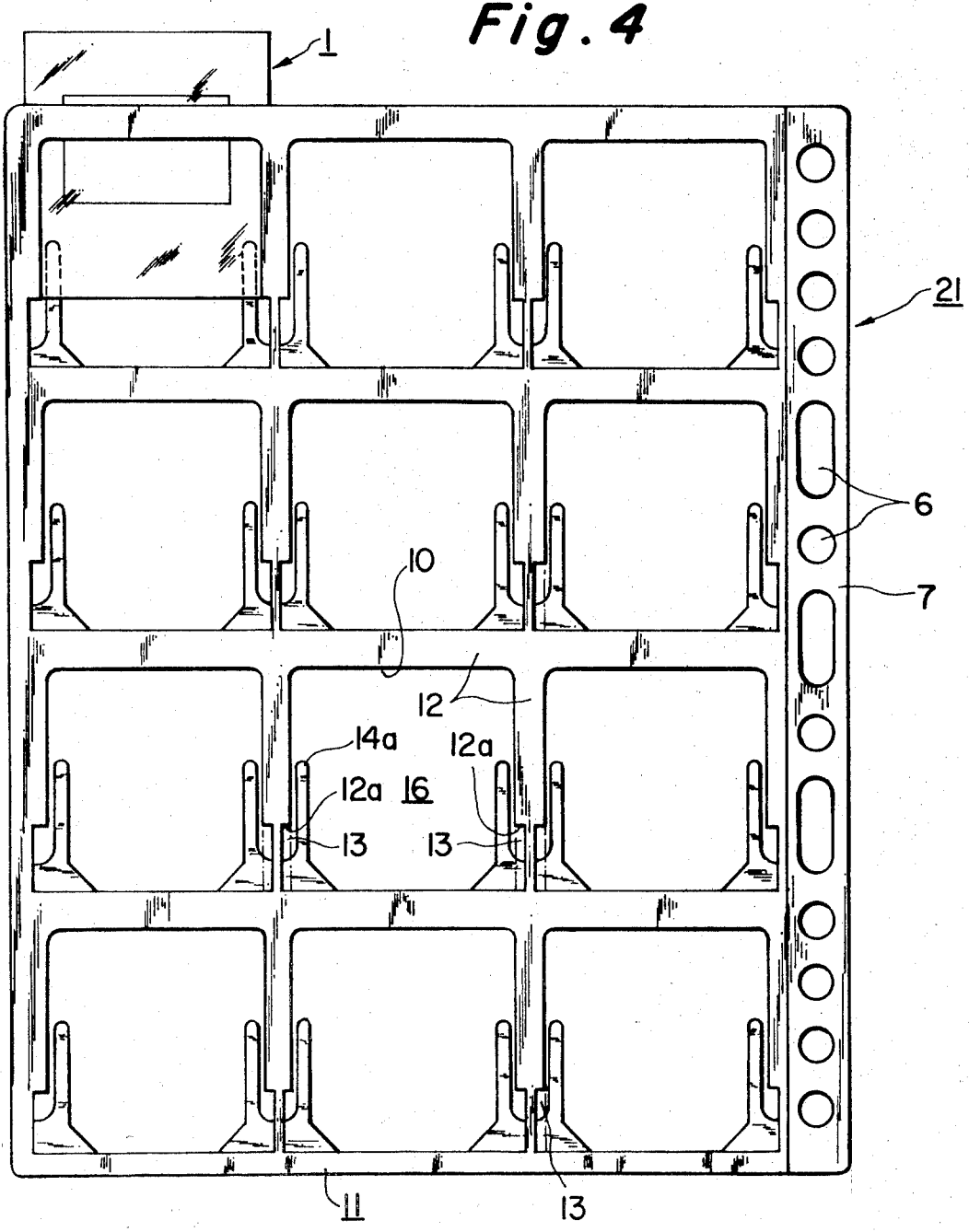
FIG. 4 is a rear view of the filing frame of FIG. 3.

Referring to FIGS. 3 and 4, a filing frame 21 for holding a plurality of film mounts in a lattice disposition, according to the present invention, is generally rectangular in shape, and includes an ear portion 7 extending along one of its longitudinal edges. The ear portion 7 has a number of filing holes 6, which are so disposed as to facilitate the binding of a plurality of such filing frames 21 in an album form. The filing frame 21 consists of a framework 11 including a plurality of substantially square windows 10 in lattice disposition. In the embodiment of FIGS. 3 and 4, twelve such windows 10 are provided in three columns and four rows.

The framework 11 of the illustrated embodiment includes longitudinal and lateral seating ledges 12 surrounding each of the substantially square windows 10, as shown in FIG. 4. What is meant by "longitudinal" here is a direction parallel to the ear portion 7, while the "lateral" direction is perpendicular to the longitudinal direction. The framework 11 is, for instance, made of synthetic resin.

Lateral ribs 8 and longitudinal ribs 9 extend along the axes of the lateral and longitudinal seating ledges 12 of the framework 11, as shown in FIG. 3. Such ribs 8 and 9 acting as walls surrounding the individual windows 10 have a height, as measured from the upper surface of the seating ledges 12, substantially corresponding to the thickness of the film mount 1 to be filed in the filing frame 21, such as the glass mount 1 of FIGS. 1 and 2. Thus, the ribs 8, 9 and the ledges 12 define a plurality of filing spaces 16, each receiving one film mount 1, as shown in FIG. 3.

At each of the filing spaces 16, the seating ledges 12 should extend toward the center of the window 10 from the ribs 8 and 9, by a distance long enough for supporting the film mount 1 but short enough for ensuring the projection of light beams to the picture-carrying portion of each film 2 held by the film mount 1. A pair of resilient holding lugs 14 extend in parallel with opposing longitudinal ribs 9 at each filing space 16, so as to face the seating ledge 12. In the embodiment of FIG. 3, the holding lugs 14 in each filing space 16 extend from the lower lateral rib 8 toward the farthest edge of the window 10 in that filing space 16. Each lug 14 extends almost halfway between the adjacent lateral ribs 8. The spacing between the two holding lugs 14 of each holding space 16 should, of course, be wide enought to ensure the passage of light beams through the picture of the film mount 1 being held by the filing space 16. With such arrangement, the film mount 1 can be projected as held by the filing frame 21. The clearance between the opposing surfaces of the holding lugs 14 and the seating ledge 12 should correspond to the thickness of the film mount 1 to be inserted in the filing space 16.

To effectively hold the film mount 1 in the filing space 16, the resilient holding lugs 14 should preferably be biased toward the seating ledge 12. In the illustrated embodiment, the holding lugs 14 are made of a suitable resilient material, such as a resilient synthetic resin, and each lug 14 is gradually bent toward the seating ledge 12 as it extends away from the lower lateral rib 8 of the filing space 16. Whereby, the spacing of the tip 14a of each holding lug 14 from the coacting seating ledge 12 is slightly smaller than the thickness of the film mount 1 to be inserted into the filing space 16, as shown in the sectional view of FIG. 5. Thus, when a film mount 1 is inserted into the filing space 16, the tip 14a of the holding lug 14 is forced away from its normal unloaded position against the resiliency of the lug. As a result, the film mount 1 is urged against the seating ledge 12 by the resiliency of the holding lugs 14, so that the film mount 1 is securely held in the filing space 16 of the filing frame 21.

To facilitate such holding action of the lugs 14, it is also possible to bend the tip portion 14a of the holding lug 14 toward the seating ledge 12. With such bent tip 14a, the urging force acting on the film mount 1 in the filing space 16 will be increased, and the film mount 1 may be more securely held in the filing space 16.

Figure 7:
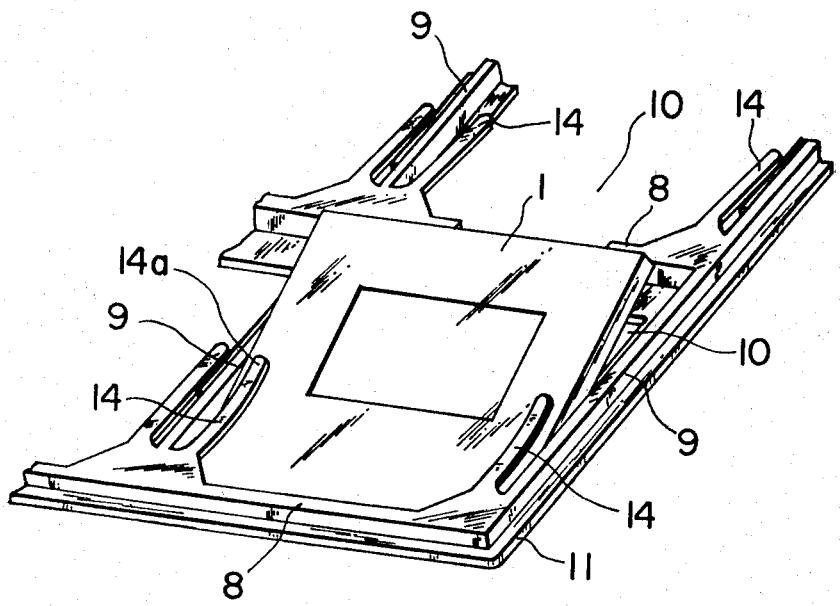
FIG. 7 is another enlarged partial perspective view similar to FIG. 6, showing a glass mount being inserted in the filing frame.

According to an important feature of the present invention, a notch 13 is formed at each longitudinal seating ledge 12 adjacent the lower lateral rib 8, or at the foot of each holding lug 14, as shown in FIG. 4. In the figure, if such notch 13 is not provided, each longitudinal seating ledge 12 would have a constant width, as indicated by the dash dot lines in FIG. 4. The longitudinal length of the notch 13 is such that, when that edge of the film mount 1 stored in the filing space 16 which is adjacent the lower lateral rib 8 is depressed toward the seating ledge, as shown by the arrow P of FIG. 8, the film mount 1 may be pivoted about border edges 12a between the non-cut portions of the seating ledge 12 and the notches 13. Thus, the film mount 1 tilts while using the border edges 12a as a fulcrum, and the upper edge of the film mount 1, which is adjacent to the upper lateral rib 8 of the filing space 16, rises above the level of the lateral and longitudinal ribs 8 and 9, as shown in FIG. 7. Accordingly, one can easily remove the film mount 1 from the frame 21 simply by holding the thus rising edge of the mount 1. The longitudinal length of the notch 13, however, should be short enough to ensure stable holding of the film mount 1 in the filing space 16 by the aforesaid resilient urging force of the holding lugs 14, so that the film mount 1 thus held in the filing frame 21 of the invention should not move or play within the filing space 16.

To facilitate the insertion and the removal of the film mount 1, relative to the filing frame 21, a finger notch 15 may be formed on the upper lateral rib 8 of each filing space 16 of the filing frame 21, as shown in FIGS. 3 and 6.

Referring to FIGS. 3 to 8, in order to insert a film mount 1 on the filing frame 21 of the present invention, the film mount 1 is slantly inserted between the holding lugs 14 and the seating ledges 12 of the framework 11 from a longitudinally upper direction. The lugs 14 act to hold the film mount 1 by urging the latter against the seating ledge 12 by its resiliency.

Figure 8:
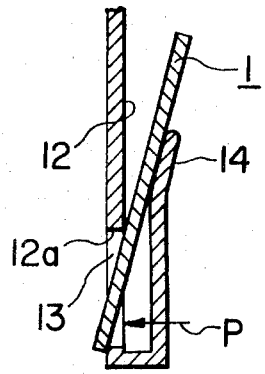
FIG. 8 is a schematic sectional view, illustrating the manner in which the glass mount is tilted relative to the filing frame according to the present invention.

To remove the film mount 1 from the filing frame 21, the lower edge of the film mount 1 is depressed at an intermediate point between the two holding lugs 14, so as to tilt the film mount 1 against the resiliency of the lugs 14 about the edge 12a of the notch 13 formed on the seating ledge 12, as can be seen from FIG. 8. Thus, the opposite edge of the mount 1 rises above the plane of the filing frame 21. One can nip the edge of the mount 1 thus rising, for removing it from the filing frame 21 by pulling it slantly upwards relative to the filing space 16 of the filing frame.

Salient features of the filing frame according to the present invention are as follows.

1. The filing spaces 16 for holding individual film mounts 1 are formed by using the structural framework 11 itself as the seating ledges of the film mounts, so that the overall thickness of the filing frame is thinner than conventional filing frames or conventional filing plates of similar storing capacity. As a result, the filing frame of the invention can be light in weight, and the amount of the material necessary for the manufacture of the filing frame can be saved. Furthermore, the simple structure of the filing frame makes it possible to reduce the man-hours necessary for its manufacture, so that the filing frame of the invention can be produced at a low cost.

2. The holding lugs 14 for resiliently holding each film mount 1 in the filing space 16 of the filing frame 21 are integrally formed with the framework ribs secured to the framework 11. Thus, there is no need for using any separate holding means for keeping the film mounts 1 in position within the filing spaces 16 of the filing frame 21. Accordingly, the film mounts 1 can be securely held by the filing frame 21.

3. The edge 12a between the longitudinal seating ledge 12 and the notch 13 provides a fulcrum for pivoting the film mount 1, so as to facilitate the removal of the film mount 1 out of the filing frame 21. The notch 13 allows the film mount 1 to be slantly inserted in the filing space 16, to facilitate the insertion of the film mount 1 to the filing frame 21. With such notch 13 and the edge 12a, the process of insertion and removal of the film mounts 1 onto and away from the filing frame 21 is greatly simplified.

4. The seating ledge 12 and the holding lugs 14 are so related to the windows 10 of the filing frame 21 that the picture carried by each film mount 1 can be inspected and projected while keeping the film mounts 1 as filed on the filing frame 21. The filing frame of the present invention can be used together with a suitable film projector for projecting pictures of the film mounts without removing them from the filing frame.

The filing frame of the present invention is particularly suitable for filing a plurality of glass mounts. In order to protect the picture-carrying surface of the film, the glass mount has increasingly been used, because the structure of conventional paper mounts exposes the picture-carrying surface of the film to the atmosphere and the heat energy emanating from the light source of a projector. Dust particles and moisture in the atmosphere under different conditions and the heat energy from the projector light source tend to adversely affect the quality of the picture carried by the film being held by a conventional paper mount.

The thickness of a glass mount which is most commonly used throughout the world at the present is 3.2 mm. If a pair of glass plates, each being 0.7 mm thick, are used for holding a 0.4 mm thick slide film, only 1.4 mm is left for a plastic supporting frame. With conventional techniques, it has been necessary to use a casting process for producing such a thin plastic supporting frame of glass mounts, resulting in a high manufacturing cost.

The applicant has succeeded in providing an improved glass mount structure, which is of simple construction and suitable for mass production at a low cost.

Referring to FIGS. 9 to 11, the opposite surfaces of a film 2 carrying a picture 2a are covered by a folded light-interrupting paper 17, which light-interrupting paper 17 has a pair of windows 18 to be aligned with the picture 2a of the slide film 2. A pair of glass plates 4 sandwich the folded paper 17 holding the slide film 2 therein.

In a preferred embodiment of the present invention, one edge 19 of one of the two glass plates 4 is connected to the corresponding edge 19 of the other glass plate 4 with a suitable spacing therefrom, by means of a flexible connector 20. As best shown in FIG. 11, the connector 20 acts as a hinge to pivotally connect the two glass plates 4 in a swingable manner about the connector 20.

When the two glass plates 4 are brought together for holding the folded light-interrupting paper 17 carrying a slide film 2, there is provided a spacing S between the opposing surfaces of the two glass plates 4, as shown in FIGS. 9 and 10. The spacing S corresponds to the total thickness of the folded light-interrupting paper 17 and the slide film 2. If a suitable adhesive is applied to the inner and outer surfaces of the folded light-interrupting paper 17, the slide film 2 may be permanently held by the paper 17 and the glass plates 4 in the form of a glass mount 1.

On the other hand, if no adhesive is applied to the folded paper 17 or the glass plates 4, the glass mount 1 can be used for projecting a number of different slide films 2 by successively replacing the films 2 to be held by the folded paper 17 and the pair of glass plates 4.

The glass mounts 1, as shown in FIGS. 9 to 11, can be stored in an orderly fashion by the filing frame 21 according to the present invention, and the pictures carried by the glass mounts 1 can easily be inspected and projected as held by the filing frame 21, without removing the glass mounts 1 from the filing frame 21.

The use of filing frame 21, according to the present invention, however, is not restricted to such glass mounts 1, as shown in FIGS. 9 to 11, but any other form of film mount 1 can be conveniently handled by the filing frame 21. It is apparent to those skilled in the art that the size of individual filing spaces 16 of the filing frame 21 can be suitably selected so as to fit any film mounts to be held thereby.

What is claimed is:

1. A filing frame for film mounts, comprising a substantially rectangular plate-like framework having a plurality of rectangular window openings disposed in a lattice form; a plurality of longitudinal straight ribs disposed on the upper surface of the framework parallel to a longitudinal edge of the rectangular framework and extending along longitudinal edges of the window openings with a spacing therefrom, the spacing between adjacent longitudinal ribs being not less than the lateral width of each film mount to be held by the filing frame; a plurality of lateral straight ribs disposed on the upper surface of the framework at right angles to the longitudinal ribs and extending along lateral edges of the window openings with a spacing therefrom, the spacing between adjacent lateral ribs being not less than the longitudinal width of each film mount to be held by the filing frame; seating ledges extending between the edges of the window openings and the ribs; a pair of resilient holding lugs extending along opposing side edges of each window opening, each holding lug extending from the top of one of said ribs and being so inclined as to gradually approach the seating ledge as the lug extends away from said rib; and a pair of notches for each window opening comprising cut-away parts of the seating ledges underneath the holding lugs, said notches having bottom edges and border edges between said bottom edges and the edges of the remaining portions of said seating ledges, the space between said bottom edges of each window being free and of a length not less than said longitudinal width of the associated film mount whereby each film mount being filed can swing about said border edges of the seating ledges while allowing a part of the film mount to freely pass through the notches.

2. A filing frame according to claim 1 and further comprising an ear piece attached on a longitudinal edge of the framework, said ear piece including a plurality of filing holes for filing a plurality of such filing frames in an album fashion.

3. A filing frame according to claim 1, in which the height of the ribs is about equal to the thickness of the film mount.

* * * * *